June 4, 1963    F. J. CARSON    3,092,481
GLASS BENDING MOLD
Filed Dec. 30, 1957    2 Sheets-Sheet 1

INVENTOR.
Frank J. Carson
BY Nobbe & Swope
ATTORNEYS

June 4, 1963    F. J. CARSON    3,092,481
GLASS BENDING MOLD
Filed Dec. 30, 1957    2 Sheets-Sheet 2
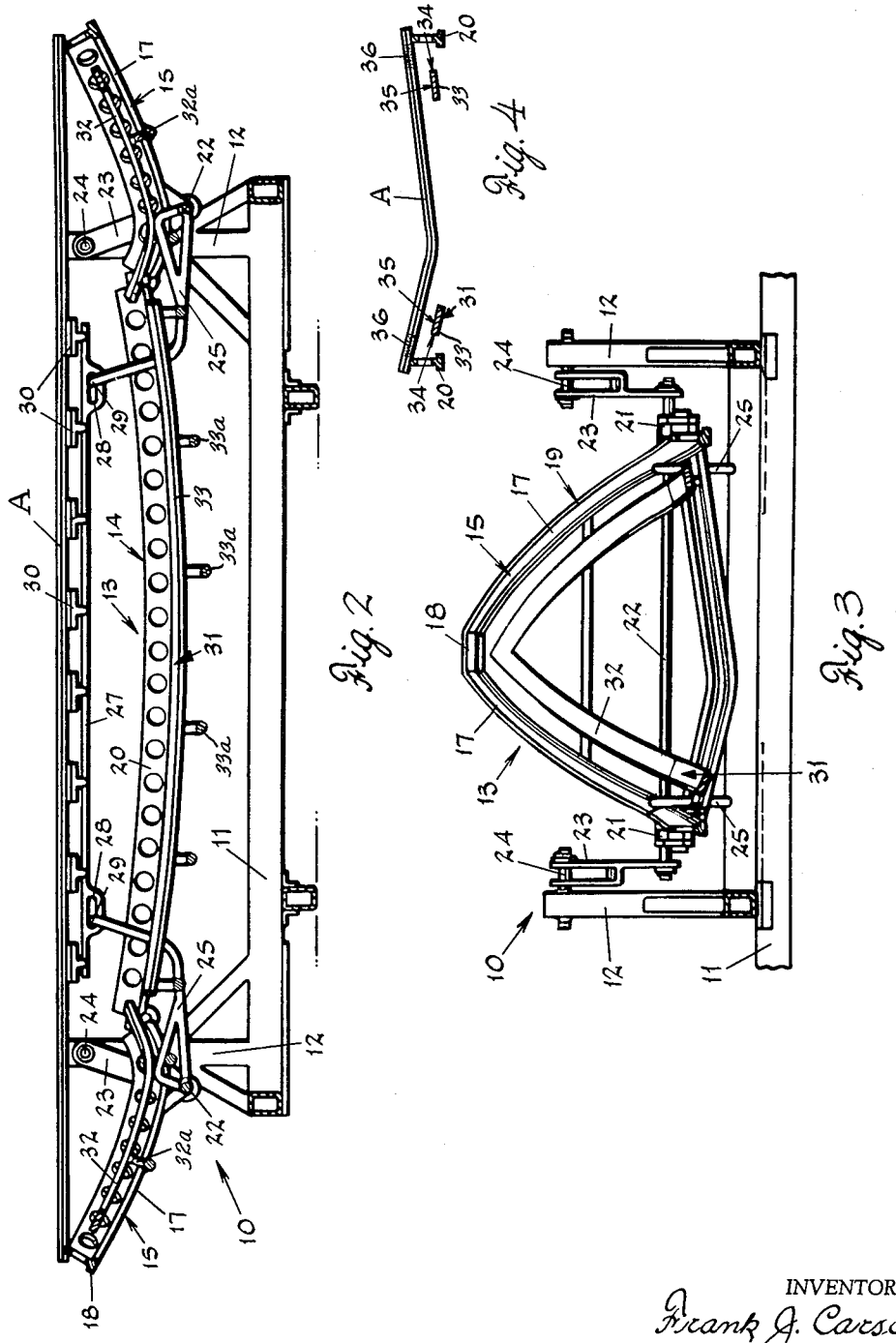
INVENTOR.
Frank J. Carson
BY
Nobbe & Swope
ATTORNEYS United States Patent Office 3,092,481
Patented June 4, 1963

3,092,481
GLASS BENDING MOLD
Frank J. Carson, Toledo, Ohio, assignor to Libbey-Owens-Ford Glass Company, Toledo, Ohio, a corporation of Ohio
Filed Dec. 30, 1957, Ser. No. 705,916
4 Claims. (Cl. 65—288)

The present invention relates generally to the bending of glass sheets, and more particularly to an improved glass bending mold.

This application is a continuation-in-part of copending application Serial No. 574,329, filed March 27, 1956, now Patent No. 2,893,170.

It has been found extremely desirable to provide bent glass sheets, for example those to be used in forming windshields, with marginal edges having compression stresses. By providing compression stresses in the edges of the glass sheet, the sheet is more resistant to shock or fracture. In the past, one type of mold adapted to produce such sheets included a shaping rail, and a heat retaining membrane spaced inwardly from the rail and occupying substantially the entire area within the confines of the rail. After a glass sheet is bent upon such a mold and the hot sheet and mold passed through the annealing zone of a furnace, the residual heat within the mold shaping rail and the membrane causes the portions of the glass sheet immediately thereabove to cool at a less rapid rate as compared to the intermediate sheet portion therebetween thereby setting the intermediate sheet portion in compression. After being cooled, the sheet was then cut to pattern outline through the portion thereof set in compression to produce a pattern cut sheet having its edge in compression and thus structurally stronger.

As a result of using such a mold, intermediate tension areas within the pattern cut sheet were produced due to the action of the membrane which stresses in some instances were found undesirable.

In accordance with the present invention, however, a bending mold is provided which maintains the central portion of the pattern cut sheet relatively free from tension stresses thereby producing a structurally stronger sheet.

It is therefore an important object of the present invention to provide a novel and improved bending mold for bending glass sheets.

Another object of the invention is to provide an improved bending mold adapted to set up well oriented areas of stress in a bent glass sheet during the cooling thereof.

A further object of the invention is to provide an improved bending mold adapted to create clearly defined stress areas in the marginal areas of a bent glass sheet while not materially affecting the central portion of the sheet.

Other objects and advantages of the invention will become more apparent during the course of the following description when taken in connection with the accompanying drawings.

In the drawings wherein like numerals are employed to designate like parts throughout the same:

FIG. 2 is a longitudinal sectional view taken along the line 2—2 of FIG. 1 and showing the mold in the open position;

FIG. 3 is a transverse sectional view taken along the line 3—3 of FIG. 2; and

FIG. 4 is a partial transverse sectional view taken along the line 4—4 of FIG. 1.

Figure 1:
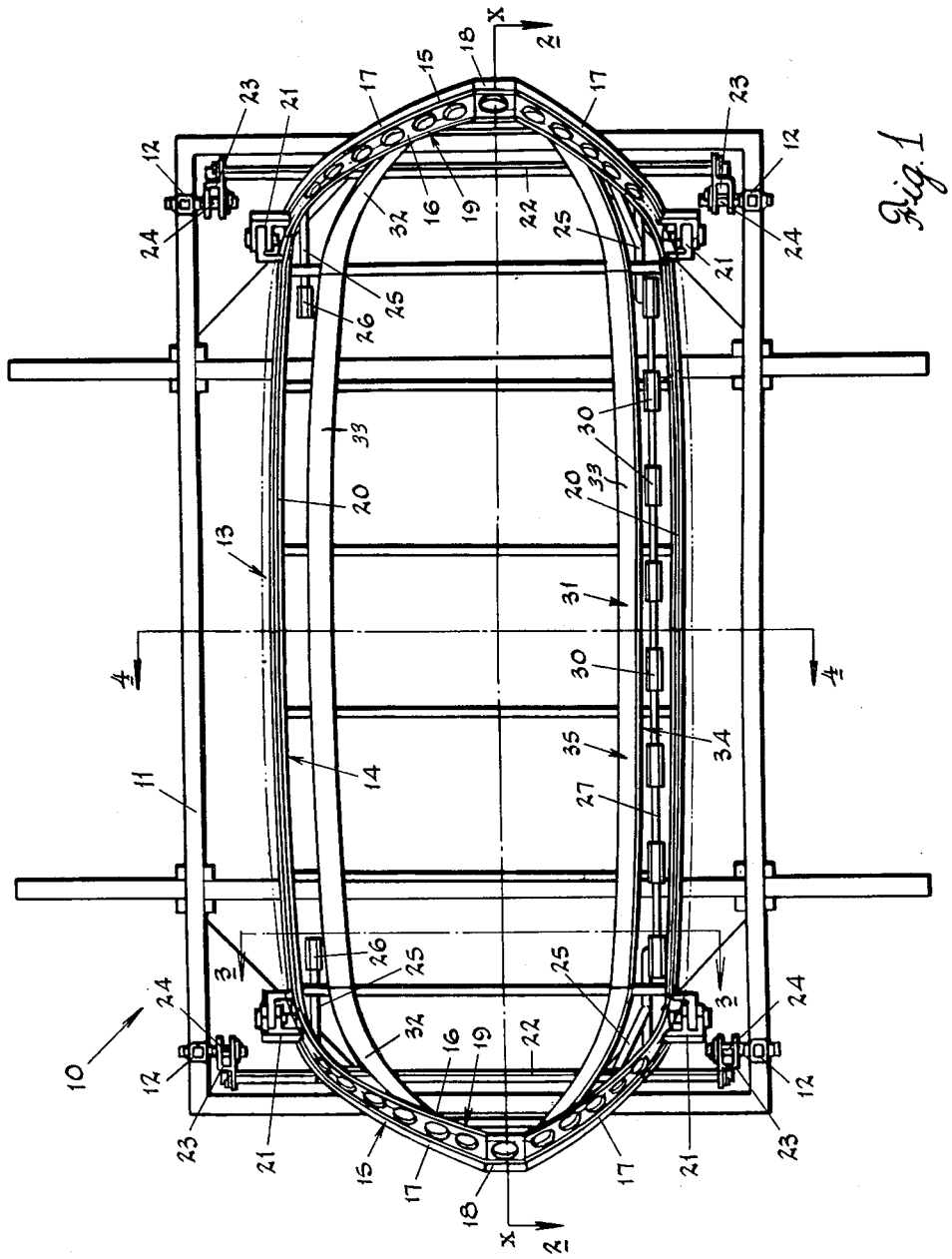
FIG. 1 is a plan view of the novel mold of the present invention shown in the closed mold position.

With reference now to the drawings and particularly to FIG. 1 there is shown in plan view the improved glass bending apparatus 10 of the present invention. The apparatus 10 comprises a conventional rectangular rack or frame 11 having corner posts 12 extending upwardly from each of the four corners thereof for supporting a multi-sectioned mold 13 above the frame.

The mold 13 is preferably of alloyed steel construction and comprises a central section 14, and a pair of oppositely disposed movably mounted end sections 15 positioned immediately adjacent opposite ends of the center section 14 and forming substantially continuations thereof.

Each of the mold end sections 15 comprises a substantially triangular or V-shaped shaping rail 16 having a relatively sharp curvature and formed by curved, converging rail portions 17 connected to one another at their outermost ends by a rail portion 18. The rail 16 has a relatively narrow upper surface 19 for receiving a glass sheet or pair of sheets A in contact therewith, and in cross section resembles an inverted T. Preferably, the glass sheet or pair of sheets have an original outline similar to the outline of the mold shaping rails and to the outline of the patterned sheet to be cut therefrom.

The central mold section 14 comprises a pair of substantially straight, spaced shaping rails 20 having a relatively shallow curvature and aligned with the innermost ends of the substantially V-shaped rail 16 and connected thereto by the conventionally used hinges 21.

The mold central and end sections are supported for movement from an open to a closed position by means of transverse rods 22 secured to the undersurface of the rails 16 of the mold end sections and extending outwardly therefrom to have their ends rotatably received in the lowermost ends of links 23 having their uppermost ends rotatably supported upon pins 24 secured to the support posts 12.

To provide an intermediate support for the glass sheet or pair of sheets during the bending thereof, a pair of inwardly directed and upwardly curved arms 25 are secured to each of the rods 22 supporting each of the mold end sections. As shown in FIG. 1, the arms 25 to one side of the longitudinal centerline x—x of the mold have sheet support blocks 26 secured to their innermost ends whereas the arms 25 on the opposite side of the mold centerline carry a sheet support member 27.

As shown in FIG. 2, the member 27 has oblong slots 28 formed at each of its opposite ends to slidably receive transverse portions 29 of the arms 25. Extending upwardly from the member 27, are a plurality of sheet support blocks 30 which, when the mold is in the open or slot sheet receiving position, are disposed in the same plane as the blocks 26 and the upper surface of the rail sections 18 on the mold end sections. During the closing action of the mold, the arms 25 rotate downwardly and inwardly with the rods 22 thus lowering and depositing the glass sheet on the mold.

In accordance with the present invention, a predetermined stress pattern is set up in the glass sheet after it is bent by means of a substantially continuous strain bar 31 which forms a closed path of limited width. The bar 31 is wider than the surface 19 of the rail 16 but of substantially uniform width and carried within the confines of the mold shaping rails and spaced inwardly and downwardly therefrom. Preferably, the bar 31 is formed of black iron and is of greater width than depth suitable dimensions being 1" x ¼". The bar 31 comprises substantially V-shaped end portions 32, carried by the mold end sections 15 by means of rods 32a, and aligned substantially straight, spaced central portions 33 carried by the mold center section by means of additional rods 33a. In the closed mold position of FIG. 1, the various strain bar portions abut one another to form a substantially continuous structure.

As shown in FIGS. 1 and 3, all portions of the outer edge 34 of the strain bar 31 are spaced a substantially equal distance from adjacent portions of the mold shaping rails. In addition, respective portions of the bar 31 have their upper surfaces contoured to substantially the same curvature as the upper or shaping surface of adjacent portions of the shaping rails, and all portions of the upper surface of the bar 31 are spaced downwardly a substantially equal distance from the upper surface of an adjacent portion of the shaping rails.

In order to have a substantially uniform effect on the glass sheet or sheets by the strain bar 31, the bar although generally following the curvature of an adjacent rail section is bent or inclined in such a manner that its upper surface 35 is inclined inwardly and downwardly relative to the upper surface of an adjacent rail section so that, as shown in FIG. 4, the upper surface 35 of the bar is substantially parallel to the portion of the glass A immediately thereabove. Thus the bar has a more even and uniform effect upon the glass sheet. As shown in FIG. 2, the portions 32 of the bar 31 carried by the mold end sections 13 are only inclined at an angle at their innermost ends and at their outermost ends are relatively parallel to the surface 19 of the end section shaping rails since the portions of the bent glass sheet supported by the outermost extremities of the mold end sections remain substantially flat between their longitudinal edges due to their extending upwardly when bent thus not allowing gravity to materially effect these sheet portions.

In bending a glass sheet or pair of sheets with the improved mold of the present invention, the mold is swung to the open position and the glass sheet placed thereon. The mold is then passed through a furnace wherein the sheet is heated and bent into conformity with the hot mold.

After the sheet is bent, the hot mold and bent sheet are passed through a furnace annealing zone having a gradually reduced temperature wherein the sheet is gradually cooled or annealed. During the passage of the mold and bent glass sheet through the furnace annealing zone, the residual heat within the mold shaping rail sections and the strain bar 31 causes the portions of the glass sheet immediately thereabove to cool at a less rapid rate than is the case with the portion 36 of the glass sheet therebetween. As a result, this intermediate sheet portion cools more rapidly and thus sets in compression. After being cooled, the glass sheet is removed from the mold and cut to pattern along a line preferably located adjacent the innermost edge of the portion 36 thus providing a bent glass sheet having a pattern outline similar to the outline of the mold shaping rails and having its marginal edge set in compression and therefore materially stronger.

Although the mold 13 has been illustrated as having substantially V-shaped end sections, it will be understood that for bending block size glass sheets the end sections 13 could be of rectangular construction in which case the converging rail portions 17 would be substantially straight and the rail section 18 materially longer. The V-shaped end portions of the strain bar, however, would retain their same configuration.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for bending a glass sheet and forming a stress pattern in the sheet having peripheral areas in compression while central portions thereof are relatively free from tension stresses, a bending mold comprising a substantially continuous curved shaping rail, and a heat retaining member consisting solely of a bar enclosing an open area spaced inwardly from said shaping rail and spaced from a glass sheet when supported on said shaping rail, said bar having a curvature substantially corresponding to the curvature of the shaping rail.

2. In apparatus for bending a glass sheet and forming a stress pattern in the sheet having peripheral areas in compression while central portions thereof are relatively free from tension stresses, a bending mold comprising a relatively narrow shaping rail, and a heat retaining member consisting solely of a bar of greater width than said shaping rail, said bar enclosing an open area and being spaced inwardly and downwardly from said shaping rail.

3. In apparatus for bending a blank size glass sheet and forming a substantially continuous compression band therein which surrounds a central portion which is relatively free from tension stresses and defines the pattern to which the blank size sheet is to be subsequently cut, a substantially continuous shaping rail defining the curvature to which the blank size glass sheet is to be bent, and a heat retaining member consisting solely of a substantially continuous bar spaced inwardly and downwardly from said shaping rail and enclosing an open area, said bar having spaced, curved end portions and aligned, substantially straight spaced central portions.

4. A bending mold for bending glass sheets as defined in claim 2, wherein the heat absorbing member is spaced substantially equally both inwardly and downwardly from the glass engaging surface.

References Cited in the file of this patent

UNITED STATES PATENTS

| 2,348,278 | Boyles et al. | May 9, 1944 |
| 2,452,488 | Paddock et al. | Oct. 26, 1948 |
| 2,691,854 | Rugg | Oct. 19, 1954 |
| 2,720,729 | Rugg | Oct. 18, 1955 |

FOREIGN PATENTS

| 1,097,088 | France | Feb. 9, 1955 |
| 1,128,601 | France | Oct. 27, 1956 |
| 201,078 | Australia | Feb. 22, 1956 |
| 768,485 | Great Britain | Feb. 20, 1957 |